United States Patent [19]

Kauffman et al.

[11] 3,982,872

[45] Sept. 28, 1976

[54] LATERAL TRANSFER LOADING APPARATUS FOR STRETCH BLOW MACHINES

[75] Inventors: Ivan L. Kauffman, Commerce Township, Oakland County; Robert C. Kellogg, Hartland Township, Livingston County, both of Mich.

[73] Assignee: Ex-Cell-O Corporation, Troy, Mich.

[22] Filed: June 16, 1975

[21] Appl. No.: 587,949

[52] U.S. Cl. .................. 425/397; 425/DIG. 213; 425/DIG. 216; 425/387 B
[51] Int. Cl.² ........................................ B29C 17/02
[58] Field of Search ....... 425/387 B, 397, DIG. 203, 425/DIG. 216, DIG. 211, DIG. 213; 264/94

[56] References Cited
UNITED STATES PATENTS

| | | | |
|---|---|---|---|
| 3,797,983 | 3/1974 | Merz | 425/DIG. 211 |
| 3,819,314 | 6/1974 | Marcus | 425/DIG. 213 |
| 3,850,562 | 11/1974 | Jakeuchi et al. | 425/DIG. 216 |

*Primary Examiner*—Richard B. Lazarus

[57] ABSTRACT

A lateral transfer preform loading method and apparatus for stretch blow molding machines. The method of the present invention incorporates the principle of laterally shuttling a set of finished products from a mold assembly and simultaneously shuttling laterally a set of preforms into the mold assembly. The first named set of finished products is discharged while the aforementioned preforms are going through a stretch blow molding operation to produce a second set of finished products. The second named set of finished products is then shuttled laterally from the mold assembly while simultaneously another set of preforms is moved laterally into operative relationship with the mold assembly. The aforementioned simultaneous steps of loading and unloading the mold assembly are continuously repeated. The mold assembly may be provided with one or more molds. The method may be carried out with a plurality of mold assemblies. The lateral transfer apparatus employed in the present invention includes, a loading station on each side of the mold assembly, and a pair of stretch pin assembly carrier means, whereby the pair of carrier means may be alternately and simultaneously moved laterally between their respective loading station and the mold assembly.

18 Claims, 7 Drawing Figures

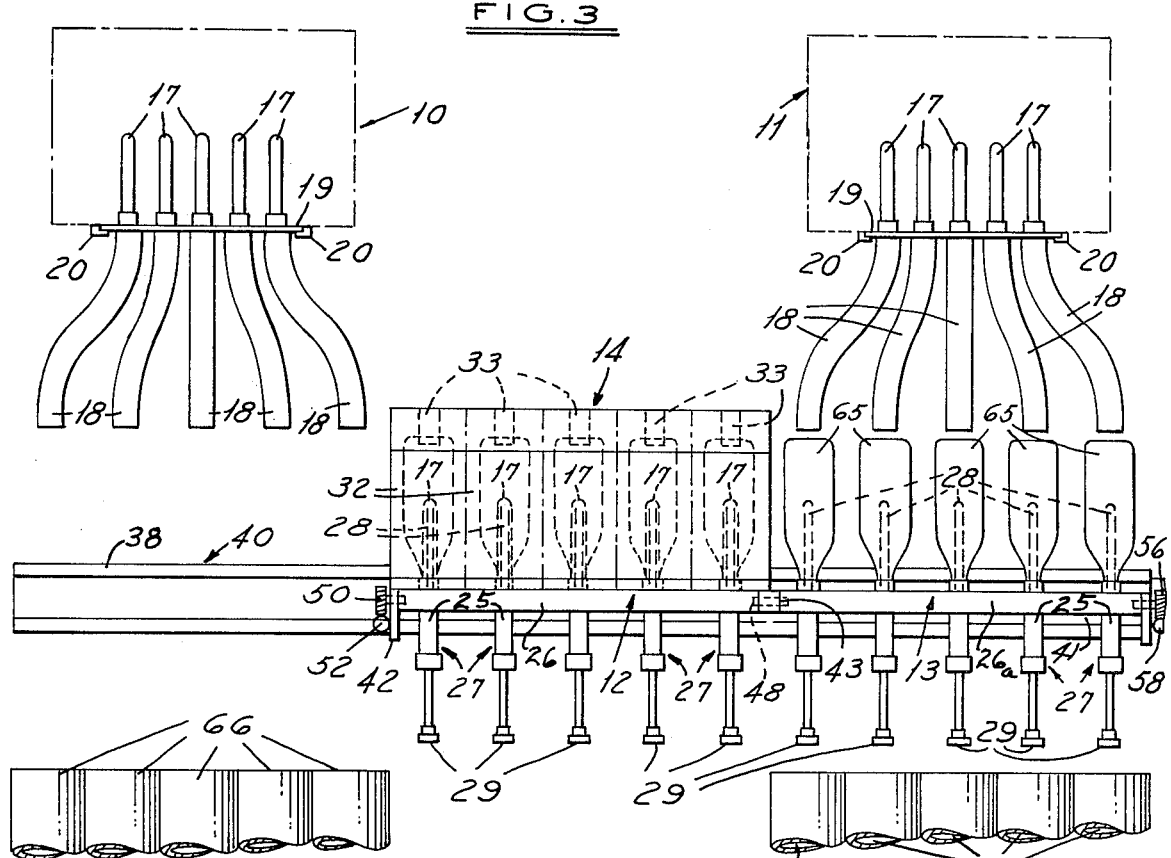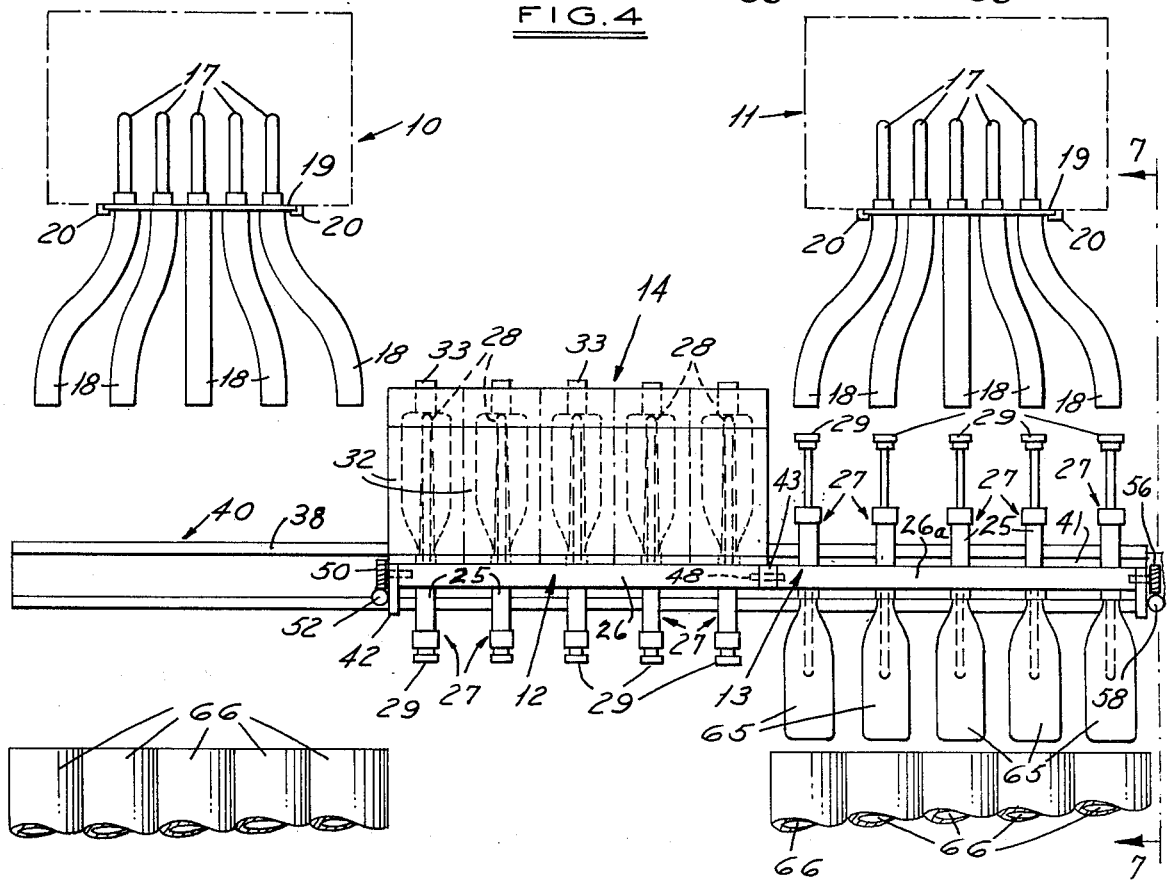

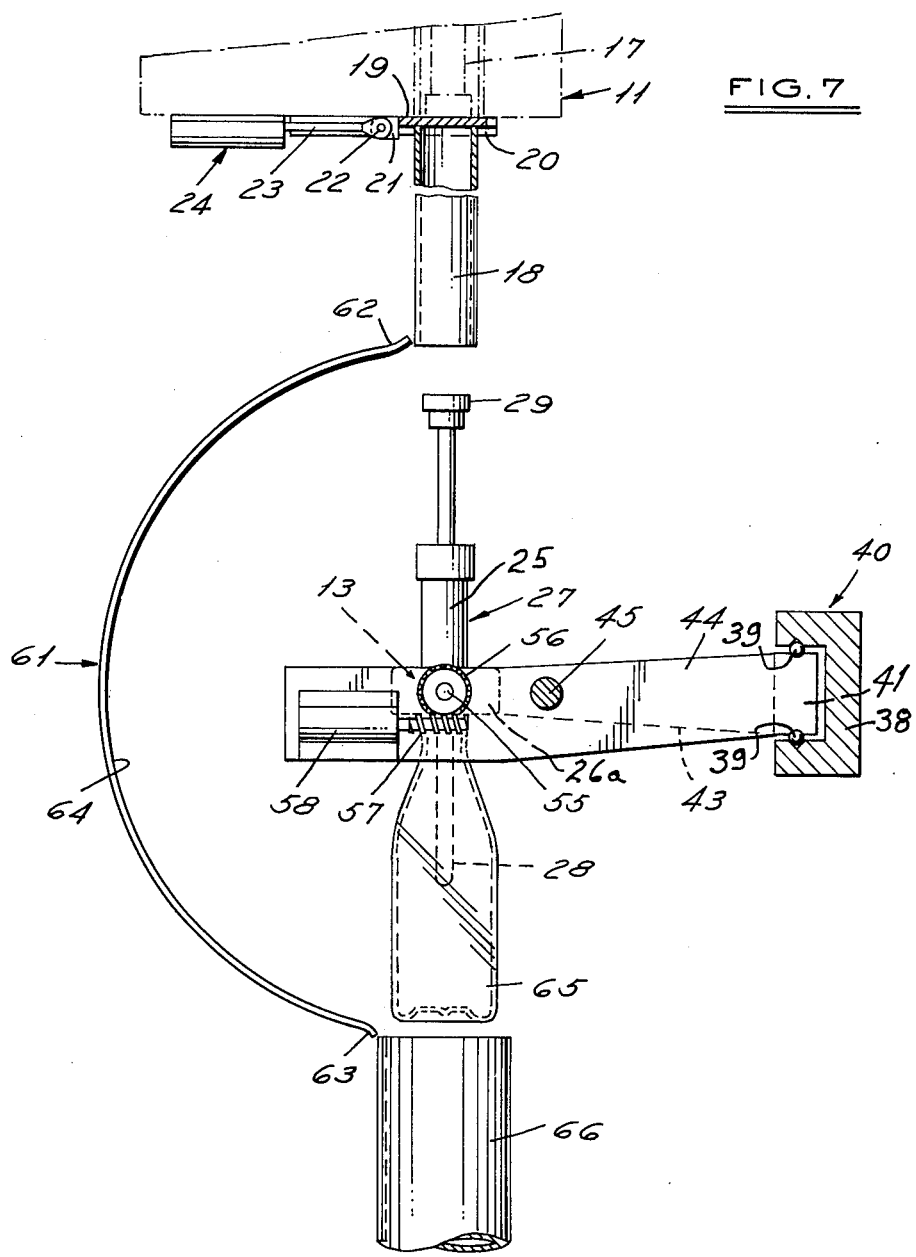

LATERAL TRANSFER LOADING APPARATUS FOR STRETCH BLOW MACHINES

SUMMARY OF THE INVENTION

This invention relates to the stretch blow molding art, and more particularly to a lateral transfer method and apparatus for loading preforms into a stretch blow mold assembly and for unloading finished products.

Heretofore, various types of transfer apparatuses have been employed for feeding preforms to a stretch blow mold assembly and for unloading finished products therefrom. A disadvantage of such prior art transfer apparatuses is that they employ a lengthy loading and unloading cycle which results in a low mold time efficiency. In view of the foregoing, it is an important object of the present invention to provide a novel and improved method and apparatus for feeding preforms to a stretch blow mold assembly and for unloading finished products therefrom, so as to increase the mold time efficiency of the mold assembly.

It is another object of the present invention to provide a novel method and apparatus for reducing the time required to load and unload a stretch blow mold assembly.

It is still another object of the present invention to provide a novel and improved method for loading and unloading a stretch blow mold assembly, which incorporates the principle of laterally shuttling a set of finished products from a mold assembly and simultaneously shuttling a set of preforms laterally into the mold assembly. The first named set of finished products is discharged while the aforementioned preforms are going through a stretch blow molding operation to produce a second set of finished products. The second set of finished products is shuttled laterally from the mold assembly while simultaneously another set of preforms is moved laterally into operative relationship with the mold assembly. The aforementioned simultaneous steps of loading and unloading the mold assembly are repeated continuously. The method may be carried out with a plurality of mold assemblies.

It is a further object of the present invention to provide a novel and improved stretch blow molding apparatus, which includes a mold assembly having at least one mold, and which comprises a first movably mounted carrier means, and a second movably mounted carrier means, each of said first and second carrier means having operatively mounted thereon at least one stretch pin assembly, a first loading station for unloading a finished product from the stretch pin assembly on said first carrier means and for loading a preform thereon, a second loading station for unloading a finished product from the stretch pin assembly on said second carrier means and for loading a preform thereon, and means for moving alternately, said first carrier means between said first loading station and a position in operative relationship with said mold assembly, and said second carrier means between said second loading station and a position in operative relationship with said mold assembly, whereby when said first carrier means is at said first loading station the second carrier means is in said position in operative relationship with said mold assembly for forming a finished product from the preform carried thereon, and when said second carrier means is at said second loading station said first carrier means is in said position in operative relationship with said mold assembly for forming a finished product from the preform carried thereon.

It is still another object of the present invention to provide a novel stretch blow molding method for making for making a hollow plastic article from a heated elongated tubular preform having an open end and a closed end, and which comprises the steps of carrying out a stretch blow molding operation on at least one preform on a first carrier means disposed in an operative relationship with a molding apparatus to form a finished product from the preform, and simultaneously unloading at least one finished product from a second carrier means disposed at one loading station and then loading at least one preform on said second carrier means, moving said first carrier means from the molding apparatus to another loading station, and moving said second carrier means from said one loading station into an operative relationship with said molding apparatus, carrying out a stretch blow molding operation on said preform on said second carrier means to form a finished product on the preform, and simultaneously unloading the finished product from said first carrier means at said another station and then loading at least one preform on said first carrier means, moving said second carrier means from the molding apparatus to said one loading station, and moving said first carrier means from said another loading station into an operative relationship with said molding apparatus, and successively repeating the aforementioned steps.

Other features and advantges of this invention will be apparent from the following detailed description, appended claims, and the accompanying drawings.

BRIEF DESCRIPTION OF THE DRAWINGS

FIG. 3 is an elevational view, same as FIG. 1, and showing the lateral transfer apparatus shifted to the right to a second position with the first stretch pin carrier means in the mold assembly and the second stretch pin carrier means in an unload position and carrying a set of finished bottles.

FIG. 4 is an elevational view, same as FIG. 3, and showing the second stretch pin carrier means inverted to dump or unload the set of finished bottles.

FIG. 7 is a fragmentary, enlarged, partly in section, right side elevational view of the structure illustrated in FIG. 4, taken along the line 7—7 thereof, and looking in the direction of the arrows.

DESCRIPTION OF THE PREFERRED EMBODIMENT

Figure 1:
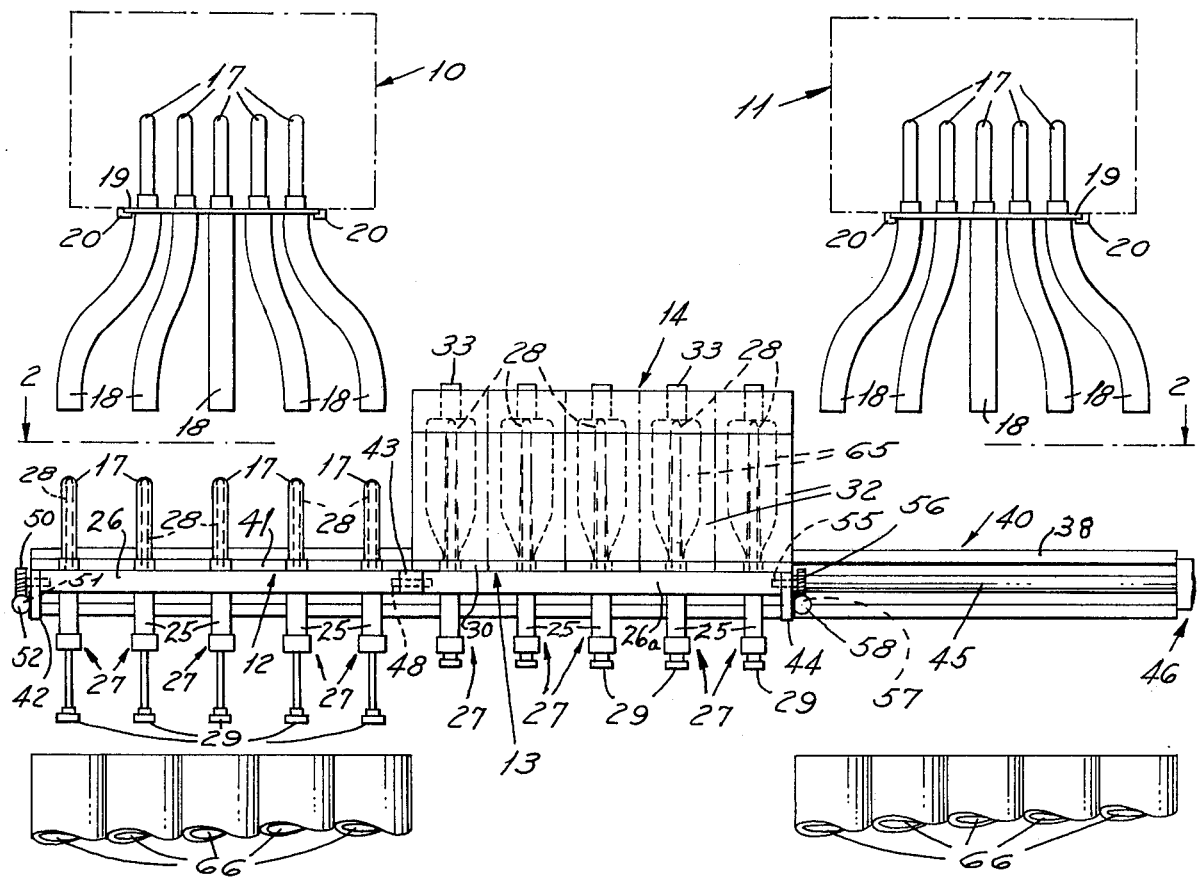
FIG. 1 is an elevational view of an illustrative embodiment of the invention which shows a lateral transfer apparatus for loading preforms in a stretch blow molding machine.

The lateral transfer loading method and apparatus of the present invention are adapted for use in the production of hollow thermoplastic articles, such as bottles and the like. The preforms employed with the apparatus of the present invention may be made from any suitable plastic resin, as for example, polymers and copolymers of polypropylene. The preforms are extruded or molded into their desired form and they are then conveyed by any suitable means to a pair of ovens, generally indicated by the numerals 10 and 11 in FIG. 1. The ovens 10 and 11 may be of any conventional type usually adapted to bring the preforms to the proper temperature for a stretch blow molding operation. The apparatuses for forming the preforms and for heating and conveying the preforms preparatory to the stretch blow molding operation do not form any part of this invention and any suitable apparatuses of that type may be employed. As shown in FIG. 1, the preforms are indicated by the numeral 17, and they are shaped in substantially test tube form. The elongated tubular preforms 17 have a closed end and an open end.

Figure 2:
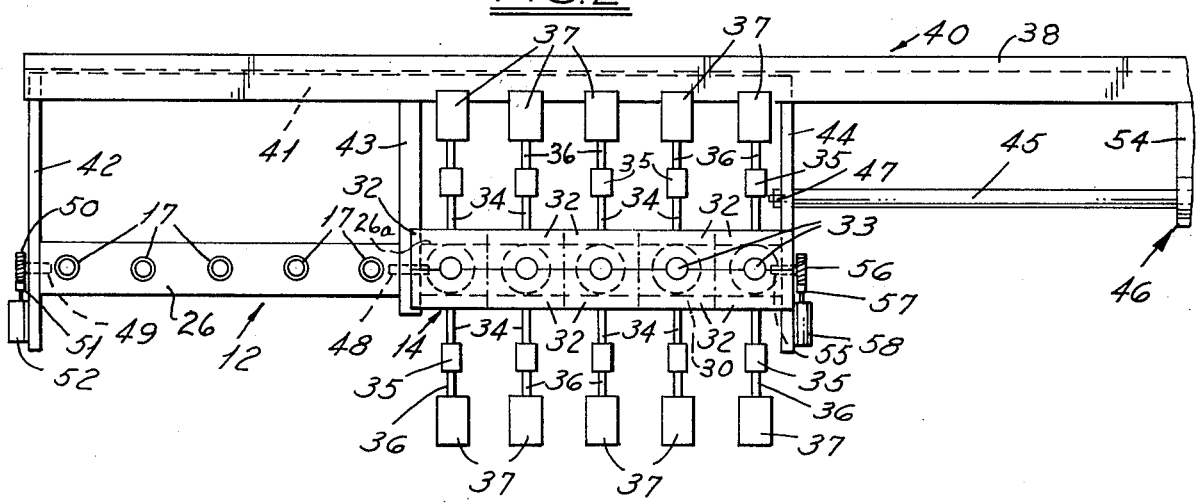
FIG. 2, is a top plan view of the lateral transfer apparatus illustrated in FIG. 1, taken along the line 2—2 thereof, looking in the direction of the arrows, and showing the lateral transfer apparatus in a first position, with a first stretch pin carrier means loaded with preforms and a second stretch pin carrier means within a mold assembly and carrying a set of finished bottles.

The lateral transfer apparatus of the present invention includes a first stretch pin carrier means and a second stretch pin carrier means, generally indicated by the numerals 12 and 13, respectively. A mold assembly, generally indicated by the numerals 14, includes a plurality of the molds which are arranged in a side-by-side relationship. FIGS. 1 and 2 illustrate the mold assembly 14 as including five molds, but it will be understood that the lateral transfer apparatus of the present invention may be employed for loading one or more molds, and that the most advantageous use of the invention is made when it is used with a plurality of ganged or aligned molds. Any suitable conventional mold structures may be employed in the mold assembly 14.

Each of the stretch pin carrier means 12 and 13 is provided with a plurality of preform stretch pin assemblies, generally indicated by the numeral 27, and each includes a preform stretch pin 28. The number of stretch pin assemblies 27 carried by each of the stretch pin carrier means 12 and 13 would be dependent upon the number of molds in the mold assembly 14. As shown in FIG. 1, each of the stretch pin carrier means of the illustrative embodiment is provided with five stretch pin assemblies 27.

Each of the preform ovens 10 and 11 is provided with a means for loading a preform onto each of the stretch pins 28. As shown in FIG. 1, each of the preform ovens 10 and 11 is provided with a sliding gate 19 which may be moved from a closed position to an opened position to allow five preforms 17 to simultaneously drop down by gravity through individual preform guide tubes 18 onto one of the stretch pins 28.

A suitable mechanism for operating the sliding gate 19 for the oven 11 is shown in FIG. 7, and a similar structure is provided for operating the sliding gate 19 for the oven 10. As shown in FIG. 7, the sliding gate 19 is horizontally disposed and slidably mounted on a horizontally disposed pair of spaced apart mounting bars 20, which are mounted on the lower side of the oven 11. The sliding gate 19 is fixed to a yoke member 21 which is pivotally attached by a pivot pin 22 to the free end of a cylinder rod 23. The cylinder rod 23 has its other end operatively mounted in a suitable fluid cylinder 24, such as a hydraulic cylinder. The hydraulic cylinder 24 is carried by the oven 10, and it functions to move the sliding gate 19 from the solid line closed position shown in FIG. 7, to a fully opened position to the left of the tube 18, as viewed in FIG. 7, to permit preforms 17 to drop downwardly from the oven 11 into the vertically aligned guide tubes 18. The guide tubes 18 may be made of any suitable material, as for example, they may be made as spiral wound metal tubes, or from plastic pipe or other suitable means. The sliding gate 19 for the oven 10 is provided with a similar means for operating the same between the closed and fully opened positions.

As shown in FIGS. 1 and 7, each of the stretch pin assemblies 27 includes a guide body 25 in which is slidably mounted a stretch pin 28. Each of the stretch pins 28 has operatively mounted on the lower end thereof an actuator block or cam block 29 for engagement with a suitable cam operated actuator means for moving the stretch pin 28 from a lowered position as shown by the stretch pins 28 on the carrier means 12 in FIG. 1, to a raised position as shown by the stretch pins 28 carried on the carrier means 13 in FIG. 1. The particular stretch pin assemblies employed, and the means for actuating the same, may be of any conventional type.

As shown in FIG. 1, the first stretch pin carrier means 12 includes an elongated platen or plate 26, in which is fixedly mounted five laterally spaced apart stretch pin guide bodies 25. The second stretch pin carrier means 13 also includes an elongated platen or plate designated by the numeral 26a in which is fixedly mounted five spaced apart stretch pin guide bodies 25.

As best seen in FIG. 2, each of the molds in the mold assembly 14 is illustrated as comprising a five-piece mold, which includes a pair of side pieces or mold halves 32, a mold top end plug 33, and a pair of neck rings or neck clamps 30 carried by the mold halves 32. The molds may be of any suitable type, and supported in any suitable manner, so that the lateral transfer apparatus of the present invention may load preforms therein. Each of the mold halves 32, and the neck clamps 30 which it carries, may be moved laterally apart from the other mold half 32 and neck clamp 30, by any suitable means as, for example, by the structure illustrated in FIG. 2. As illustrated in FIG. 2, each of the mold halves 32 is operatively attached to the free end of a cylinder rod 34 which has its other end operatively mounted in a suitable fluid cylinder 35, such as a hydraulic cylinder. The fluid cylinder 35 is attached to and carried on the outer end of the cylinder rod 36 of a second fluid cylinder 37 which would be fixedly supported in any suitable manner. The fluid cylinder 37 may be any suitable hydraulic cylinder, and would be of a larger capacity than the fluid cylinder 35. The cylinder 35 would function to move the mold halves 32 between the opened and closed positions to permit the insertion within the molds of the preforms 17 by the lateral transfer apparatus of the present invention. The larger cylinder 37 would function to provide a holding pressure on the mold halves 32. It will be understood that the mold halves 32 may be moved between the opened and closed positions by any other suitable means as, for example, a mechanically actuated toggle means, or the like.

As best seen in FIGS. 1, 2 and 7, the first and second stretch pin carrier means 12 and 13, respectively, are operatively supported for lateral movement relative to the mold assembly 14 on a ball slide assembly, generally indicated by the numeral 40. The ball slide assembly 40 includes a fixed elongated ball slide channel frame 38 which is disposed on its side with its open end facing forwardly toward the mold assembly 14. An elongated slide bar 41 is slidably mounted in the channel frame 38 by a suitable bearing means, as for example, a plurality of ball bearing members 38 (FIG. 7). As shown in FIG. 2, the first and second stretch pin carrier means 12 and 13, respectively, are operatively supported by a plurality of horizontal support bracket arms 42, 43 and 44. The rearward ends of each of the support bracket arms 42, 43 and 44 are fixedly attached to the slide bar 41 by any suitable means, as by welding.

As shown in FIGS. 1 and 2, a transverse pivot shaft 48 is fixedly mounted in the forward end of the support bracket arm 43. As viewed in FIGs. 1 and 2, the right end of the first stretch pin carrier means platen 26 is rotatably mounted on one of the projecting ends of the shaft 48. The left end of the platen 26 is fixedly mounted on one end of a shaft 49 which is rotatably mounted in the support bracket arm 42, and which extends therethrough. The shafts 48 and 49 are axially aligned.

The platen 26 is adapted to be rotated about the axes of the shafts 48 and 49 by the following described structure. As shown in FIGS. 1 and 2, a driven worm wheel or gear 50 is fixed on the outer end of the rotatable shaft 49 by any suitable means. The worm wheel 50 is operatively engaged with and driven by a worm gear 51 which is fixedly carried on the outer end of the shaft of a rotary solenoid 52. A suitable oscillating rotary fluid motor may also be used for carrying out the function of the rotary solenoid 52, and would also replace the worm wheel 50 and worm gear 51.

As viewed in FIGS. 1 and 2, the left end of the second stretch pin carrier means platen 26a is rotatably mounted on the other projecting end of the shaft 48. The right end of the platen 26a is fixedly mounted on one end of a shaft 55 which is rotatably mounted in the support bracket arm 44 and which extends therethrough. The shafts 48 and 55 are axially aligned. The platen 26a is adapted to be rotated about the axes of the shafts 48 and 55 by the following described structure.

As shown in FIGS. 1, 2 and 7, a driven worm wheel or gear 56 is fixed on the outer end of the rotatable shaft 55 by any suitable means. The worm wheel 56 is operatively engaged with and driven by a worm gear 57 which is fixedly carried on the outer end of the shaft of a rotary solenoid 58. (FIG. 7). A suitable oscillating rotary fluid motor may also be used to carry out the function of the rotary solenoid 58 and would also replace the worm wheel 56 and worm gear 57. The rotary solenoid 58 functions to turn the second stretch pin carrier means 13 between the upright position shown in FIG. 3 and the inverted position shown in FIG. 4 for dumping a set of finished bottles 65 downwardly into a plurality of product distribution tubes 66. The tubes 66 may be made in the same manner as the tubes 18, that is, either from a sprial wound wire tube or from plastic pipe or other suitable means. The rotary solenoid 52 functions in the same manner for rotating the first stretch pin carrier means 12 between the upright and inverted positions.

The first and second stretch pin carrier means 12 and 13, respectively, are movable between the position shown in FIG. 1, and the position shown in FIG. 3 by the following described structure.

As shown in FIG. 2, a suitable fluid cylinder, generally indicated by the numeral 46, such as a hydraulic cylinder, is fixedly mounted on a support bracket 54 which is fixed to the ball slide channel frame 38. The fluid cylinder 46 is shown in fragment, and it is provided with a cylinder rod 45 which has its outer end extended through the support bracket arm 44 and secured thereto by a suitable lock-nut 47. It will be seen that the fluid cylinder 46 functions to shuttle or transfer the slide structure supporting the first and second stretch pin carrier means 12 and 13, respectively, between the positions shown in FIGS. 1 and 3.

The operation of the lateral transfer loading apparatus of the present invention will be understood by assuming that the transfer apparatus is in the position shown in FIG. 1, wherein the sliding gate 19 has been operated to allow a new set of five preforms 17 to be dropped down through the guide tubes 18 onto the stretch fingers 28 carried on the first stretch pin carrier means 12. The preforms carried by the second stretch pin carrier means 13 have been stretched and blown inside the cavities in the various molds of the mold assembly 14, and the transfer apparatus is ready to be shuttled to the right from the position shown in FIG. 1 to the position shown in FIG. 3.

The mold operating fluid cylinders 35 and 37 are operated to open the molds after the preforms have been blown into the finished product, which is shown as bottles 65. The transfer fluid cylinder 46 is then operated to pull the cylinder rod 45 inwardly or to the right, as shown in FIGS. 2 and 3, whereby the first and second stretch pin carrier means 12 and 13, respectively, are moved laterally to the position shown in FIG. 3. The last mentioned transfer movement brings the new set of five preforms 17 on the first stretch pin carrier means 12 within the separated portions of the five molds of the mold assembly 14, and the finished set of bottles 65 to a discharge position, to the right of the mold assembly 14, as viewed in FIG. 3. The fluid cylinders 35 and 37 are then acutated to close the molds of the mold assembly 14 preparatory for the stretch blow operation on each of the last mentioned preforms 17. Simultaneously the rotary solenoid 58 is operated to rotate the second stretch pin carrier means 13 from the upright position shown in FIG. 3 to the inverted discharge position shown in FIG. 4.

As shown in FIG. 7, a semicircular guide bar, generally indicated by the numeral 61, is provided for guiding each of the finished bottles 65 from the position shown in FIG. 3 to the discharge position shown in FIGS. 4 and 7. The semicircular guide bar 61 includes a guide surface 64 on the inner side thereof which engages the closed end of a bottle 65 while it is being rotated from the position shown in FIG. 3 to the discharge position shown in FIGS. 4 and 7. The circular guide bar 61 is provided with an arcuate leading end 62 and an arcuate discharge end 63. It will be understood that additional suitable means may be employed for holding the finished bottle 65 on the respective stretch finger assembly 27 during the last mentioned rotating motion. For example, the bottles 65 could be retained by suitable clamps or vacuum means to prevent the bottles from dropping off the stretch fingers 27 during said rotating movement.

As shown in FIG. 4, the stretch pins 28 on the first stretch pin carrier means 12 have been moved upwardly to the fully extended position during the rotating movement of the finished bottles 65 carried by the second stretch pin carrier means 13.

After the finished bottles 65 have been rotated to the discharge positions shown in FIGS. 4 and 7, they drop off by gravity into the individual product distribution tubes 66. The distribution tubes 66 may be of any desired length and shape for conveying the finished bottles 65 to a desired location.

Figure 5:
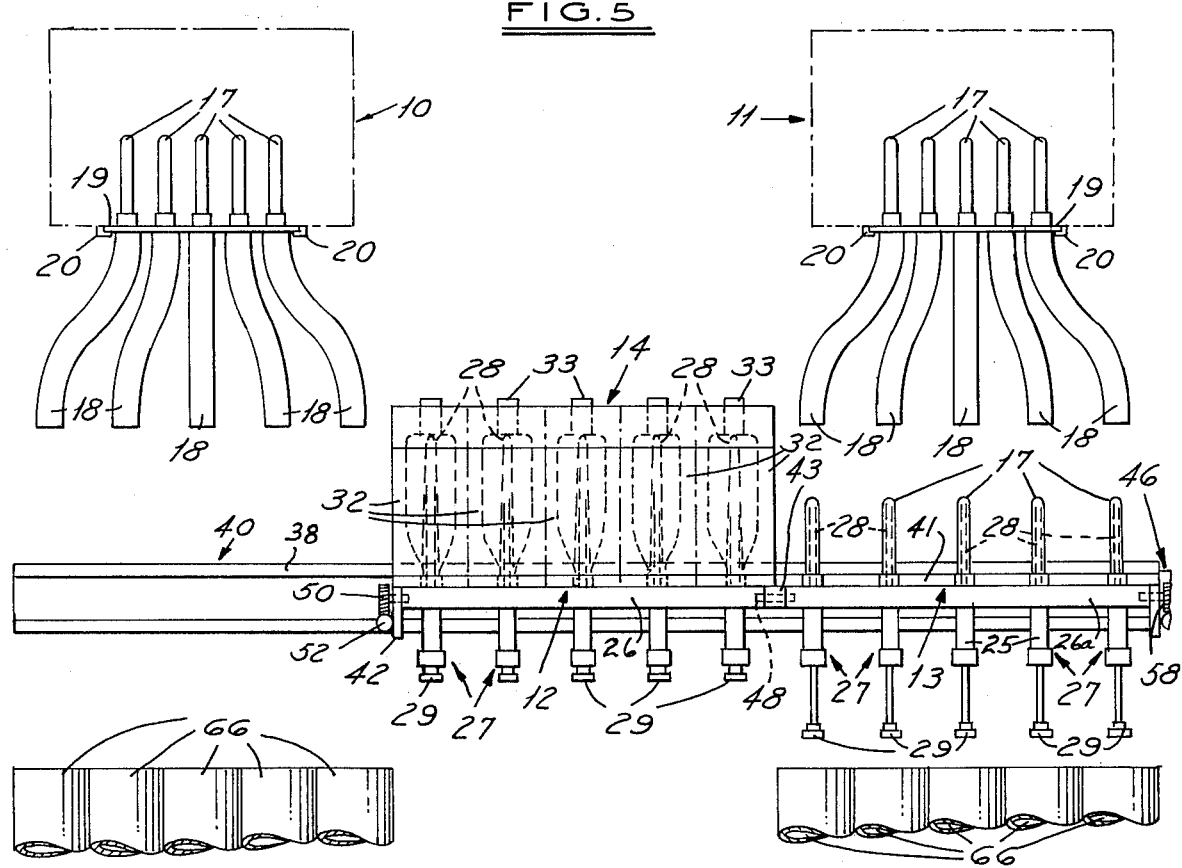
FIG. 5 is an elevational view, same as FIG. 3, and showing the second stretch pin carrier means turned upright and loaded with a set of preforms.

After the finished bottles 65 have been dumped or discharged from the stretch pin finger assemblies 27 on the second stretch pin carrier means 13, the rotary solenoid 58 operates to rotate the second stretch pin carrier means 13 to the upright position shown in FIG. 5. A new set of preforms 17 is then dropped from the oven 11 through the guide tubes 18 onto the stretch pins 28 on the second stretch pin carrier means 13. In the meantime, the preforms in the mold assembly 14 have been stretched and blown into finished bottles 65.

Figure 6:
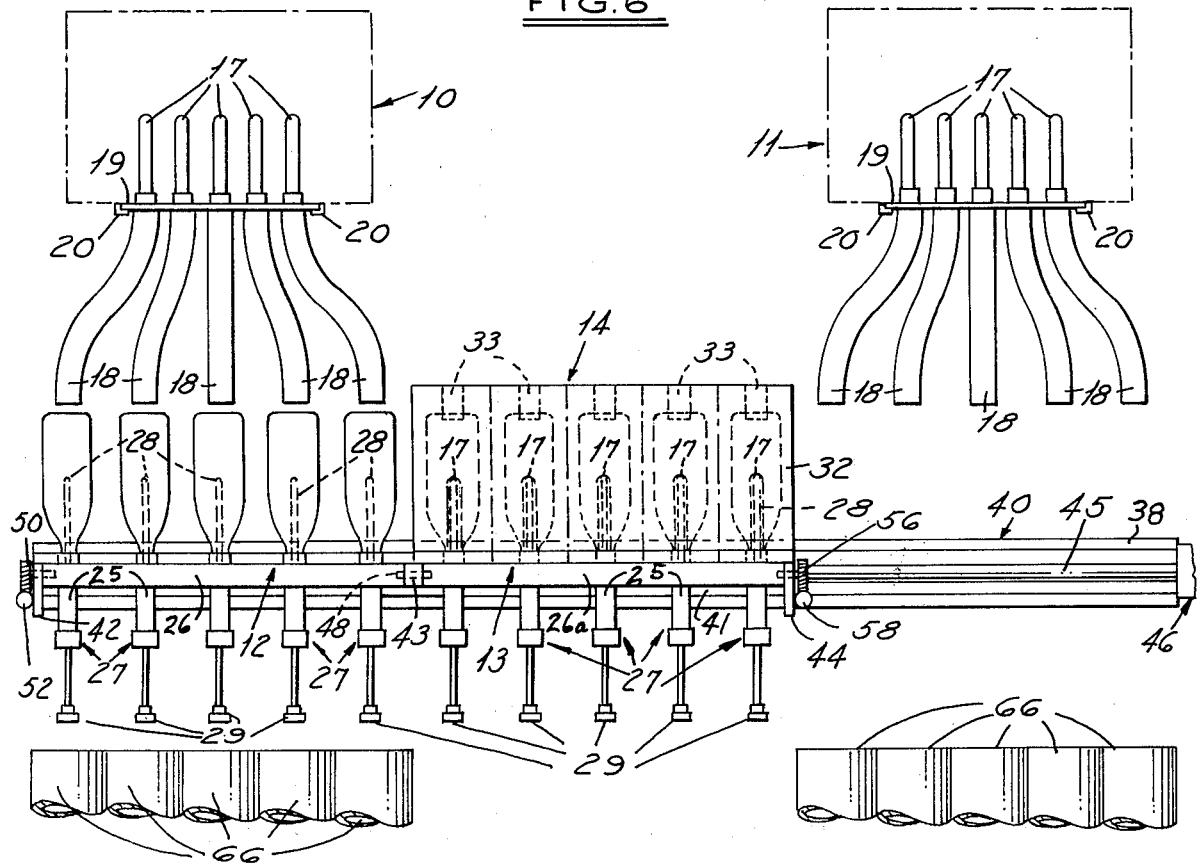
FIG. 6 is an elevational view, same as FIG. 1, and showing the lateral transfer apparatus moved back to the first position, with a set of finished bottles on the first stretch pin carrier means, and the second stretch pin carrier means moved into the mold assembly.

The mold assembly 14 is then opened by means of the fluid cylinders 35 and 37, and the transfer fluid cylinder 46 is actuated to laterally move the first and second stretch pin carrier means 12 and 13, respectively, to the left, as viewed in FIG. 6. The last mentioned lateral movement moves the finished bottles 65 out of the mold assembly 14 and the new set of preforms 17 into the mold assembly 14. The fluid cylinders 35 and 37 are then operated to close the mold assembly 14, and the rotary solenoid 52 is operated to rotate the first stretch pin carrier means 12 to an inverted discharge position identical to the discharge position shown in FIG. 7 for the second stretch pin carrier means 13 when it is in the discharge position. After finished bottles 65 have been dropped from the first stretch pin carrier means 12, the rotary solenoid 52 is actuated to rotate the first stretch pin carrier means 12 from the inverted discharge position to the upright load position, at which time it receives a new set of preforms 17, and the condition shown in FIG. 1 then exists and a complete cycle has been made.

It wil be understood that any suitable control circuit means may be used for controlling the sequential operation of the fluid cylinders 24, 35, 37 and 46, the rotary solenoids 52 and 58, and the operation of the stretch pins 28. Although the molds have been illustrated as being opened and closed by individual sets of fluid cylinders, it will be understood that all of the molds may be opened and closed simultaneously by a single operating means, if desired. The method of the present invention may be employed with any number of molds as, for example, the mold assembly 14 could include one or more molds, as desired. The total number of molds employed would only be limited by the practical factors involved in opening and closing the molds, and in transferring the first and second stretch pin assembly carrier means 12 and 13, respectively, between the loading and molding positions. It will also be understood that additional mold assemblies 14 could be employed. Each added mold assembly 14 would require only one additional oven and only one additional loading and discharge structure, since the loading station between a pair of mold assemblies 14 could function to service two mold assemblies 14. Although the guide means 66 has been shown in the form of tubes, it will be understood that they may also comprise other structures as, for example, they may be fabricated from suitable guide rods.

It will be seen that the lateral transfer loading apparatus of the present invention is advantageous timewise, because it eliminates lost molding time which is inherent in the prior art molding apparatus, since in such prior art molding apparatus a mold is inoperative while its stretch finger assembly is being unloaded and loaded with a new preform. The molding time cycle includes the steps of closing the mold, stretching the preform, blowing the preform into the final article shape, cooling the blown article, and opening the mold. The mold time cycle is longer then the time required to discharge the finished product from a stretch pin assembly 27 and load a new preform thereon. In the apparatus of the present invention, the unloading and loading of the stretch pin assemblies 27 on one carrier means takes place while the molding operation is being carried out on the preforms on the other carrier means.

While it will be apparent that the preferred embodiment of the invention herein disclosed is well calculated to fulfill the objects above stated, it will be appreciated that the invention is susceptible to modification, variation and change.

What is claimed is:

1. In a stretch blow molding apparatus, including a mold assembly having at least one mold, the combination comprising:
   a. a first movably mounted carrier means, and a second movably mounted carrier means;
   b. each of said first and second carrier means having operatively mounted thereon at least one stretch pin assembly;
   c. a first loading station for unloading a finished product from the stretch pin assembly on said first carrier means and for loading a preform thereon;
   d. a second loading station for unloading a finished product from the stretch pin assembly on said second carrier means and for loading a preform thereon; and,
   e. means for moving alternately, said first carrier means between said first loading station and a position in operative relationship with said mold assembly, and said second carrier means between said second loading station and a position in operative relationship with said mold assembly, whereby when said first carrier means is at said first loading station the second carrier means is in said position in operative relationship with said mold assembly for forming a finished product from the preform carrier thereon, and when said second carrier means is at said second loading station said first carrier means is in said position in operative relationship with said mold assembly for forming a finished product from the preform carried thereon.

2. The stretch blow molding apparatus as defined in claim 1, wherein:
   a. said means for moving the first and second carrier means, moves said first and second carrier means simultaneously.

3. The stretch blow molding apparatus as defined in claim 2, including:
   a. means at said first loading station for loading a preform on the stretch pin assembly on said first carrier means; and,
   b. means at said second loading station for loading a preform on the stretch pin assembly on said second carrier means.

4. The stretch blow molding apparatus as defined in claim 3, including:

a. means at said first loading station for conveying the finished products therefrom which are discharged from said first carrier means; and, b. means at said second loading station for conveying the finished products therefrom which are discharged from said second carrier means.

5. The stretch blow molding apparatus as defined in claim 4, wherein:

a. said molding assembly includes a plurality of molds; and, b. each of said first and second carrier means has operatively mounted thereon a plurality of stretch pin assemblies.

6. The stretch blow molding apparatus as defined in claim 2, wherein:

a. said first and second carrier means are operatively aligned for lateral transfer movement between said first and second loading stations, and their respective position in operative relationship with said mold assembly.

7. The stretch blow molding apparatus as defined in claim 2, including:

a. means for rotating said first carrier means between an upright position for receiving preforms at said first loading station and an inverted position for discharging finished products therefrom; and, b. means for rotating said second carrier means between an upright position for receiving preforms at said second loading station and an inverted position for discharging the finished products therefrom.

8. The stretch blow molding apparatus as defined in claim 2, wherein:

a. said mold assembly is disposed between said first and second loading stations.

9. The stretch blow molding apparatus as defined in claim 8, wherein:

a. said first and second carrier means are operatively aligned for lateral transfer movement between said first and second loading stations, and their respective position in operative relationship with said mold assembly; and, b. said mold assembly includes means for opening and closing the same to permit said first and second carrier means to be laterally and alternately transferred into said mold assembly into their respective operative relationship therewith.

10. The stretch blow molding apparatus as defined in claim 9, wherein:

a. said means for moving the first and second carrier means, moves said first and second carrier means simultaneously.

11. The stretch blow molding apparatus as defined in claim 10, including:

a. means at said first loading station for loading a preform on the stretch pin assembly on said first carrier means; and, b. means at said second loading station for loading a preform on the stretch pin assembly on said second carrier means.

12. The stretch blow molding apparatus as defined in claim 11, including:

a. product discharge conveyor means at said first loading station for conveying the finished products therefrom which are discharged from said first carrier means; and, b. product discharge conveyor means at said second loading station for conveying the finished products therefrom which are discharged from said second carrier means.

13. The stretch blow molding apparatus as defined in claim 12, including:

a. means for rotating said first carrier means between an upright position for receiving preforms at said first loading station and an inverted position for discharging finished products into said product discharge conveyor means at said first loading station; and, b. means for rotating said second carrier means between an upright position for receiving preforms at said second loading station and an inverted position for discharging the finished products into said product discharge conveyor means at said second loading station.

14. The stretch blow molding apparatus as defined in claim 13, wherein said product discharge conveyor means at each of said loading stations includes:

a. at least one product guide tube for conveying finished products; and, b. an arcuate guide bar for guiding a finished product into the guide tube when each of the carrier means is rotated between an upright position and an inverted position for discharging a finished product therefrom.

15. The stretch blow molding apparatus as defined in claim 14 wherein said means for moving the first and second carrier means includes:

a. a carrier means support frame movably mounted on a fixed frame member; and, b. power means operatively connected to said carrier means support frame for moving the same.

16. The stretch blow molding apparatus as defined in claim 13, wherein:

a. said molding assembly includes a plurality of molds; and, b. each of said first and second carrier means has operatively mounted thereon a plurality of stretch pin assemblies.

17. The stretch blow molding apparatus as defined in claim 16, wherein, said means for loading a preform onto each of the stretch pin assemblies at each of the loading stations includes:

a. a preform oven means at each of said loading stations; and, b. means for discharging and conveying a plurality of preforms from each of said oven means onto a plurality of stretch pin assemblies at each of said loading stations.

18. The stretch blow molding apparatus as defined in claim 17, wherein said means for discharging and conveying a plurality of preforms from each of said oven means includes:

a. a plurality of preform guide tubes at each of said loading stations for conveying preforms from the oven means at each loading station onto said plurality of stretch pin assemblies at each loading station;

b. a discharge gate operatively connected with the oven means at each of said loading station; and, c. power means for moving each of said discharge gates to an open position to allow a plurality of preforms to drop by gravity into said preform guide tubes at each loading station, and for moving the gate to a closed position.

\* \* \* \* \*